Sept. 4, 1928.
H. E. SIPE
1,682,858
BUMPER AND FENDER GUARD
Filed July 16, 1927
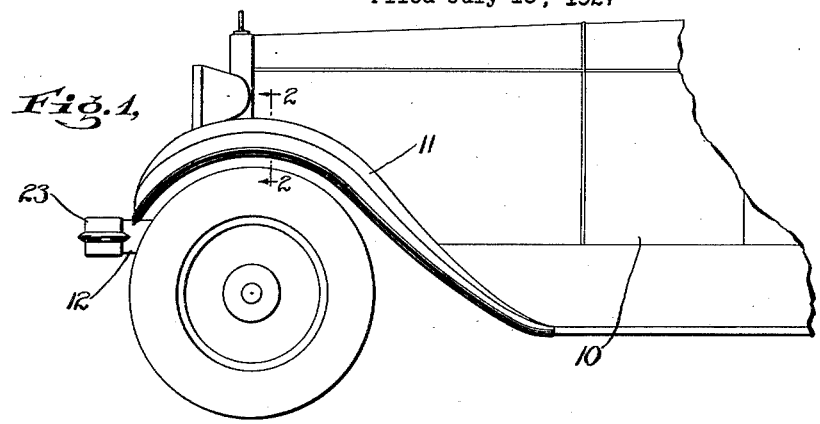
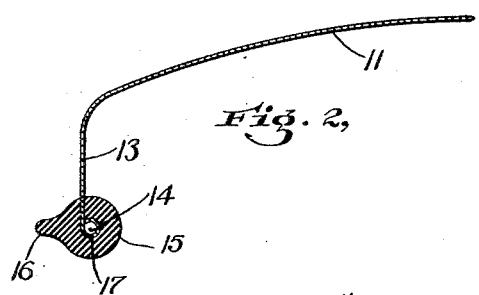
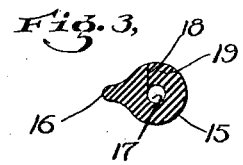
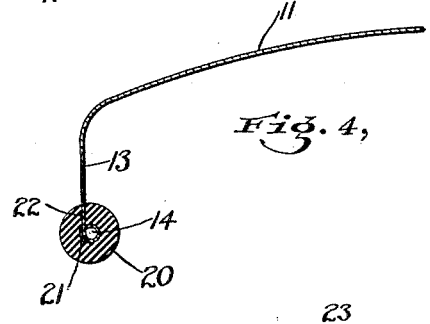
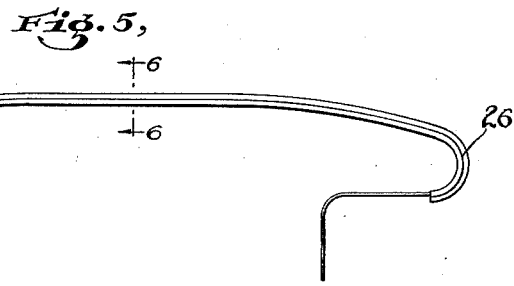
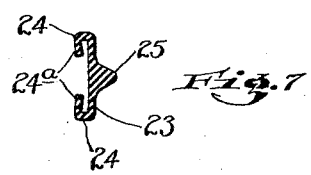
INVENTOR
Harry E. Sipe
BY
ATTORNEY Patented Sept. 4, 1928.

1,682,858

UNITED STATES PATENT OFFICE.

HARRY E. SIPE, OF NEW YORK, N. Y.

BUMPER AND FENDER GUARD.

Application filed July 16, 1927. Serial No. 206,321.

This invention relates to the provision of a guard or protector strip adapted for mounting on the fenders and bumpers of a motor vehicle; and the object of the invention is to provide an elongated body or strip of rubber, split or recessed to permit of its attachment to one edge portion of the fender or fenders of a motor vehicle or upon the exposed member or members of the bumper or bumpers of a motor vehicle to provide, by said attachment, a projecting guard portion of flexible, resilient, yieldable material which will prevent scratching, marring or other defacing of another vehicle when subjected to slight collision or engagement and especially in the operation of passing a vehicle at close quarters and especially in the attempt of parking or curbing a vehicle; a further object being to provide a guard strip of the class specified provided with a fin which projects beyond the outermost edge of the fender or bumper to take up and compensate for a slight impact or engagement with another vehicle to provide a marginal inch or fraction of an inch of safety in the attempt of passing another vehicle; a still further object being to provide a strip of the class described which may be colored to correspond with or contrast with the color of the fender or other part of the vehicle in connection with which it is mounted to provide a neat, finished and attractive marginal edge portion to the fenders of a motor vehicle as well as to the bumper or bumpers of the vehicle; and still further to protect the bumper or bumpers against corrosion and avoiding the necessity of nickel plating or other elaborate trimming or coating applied to the bumpers; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which—

Fig. 1 is a side view of the front end portion of a motor vehicle, indicating my improved guard devices mounted in connection with one fender and the bumper of the vehicle.

Fig. 2 is a section on the line 2—2 of Fig 1 on an enlarged scale.

Fig. 3 is a view similar to Fig. 2 but showing the guard detached.

Fig. 4 is a view similar to Fig. 2 but showing a modification.

Fig. 5 is a plan view of the bumper shown in Fig. 1 detached, and illustrating one of my improved guard strips mounted thereon.

Fig. 6 is a section on the line 6—6 of Fig. 5; and,

Fig. 7 is a sectional, detail view of the guard strip shown in Figs 5 and 6.

In Fig. 1 of the drawing, I have indicated at 10 the front end portion of a motor vehicle, and at 11, one of the front fenders of the vehicle, and at 12 the front bumper thereof. In the construction shown, the outer or peripheral edge portion of the fender 11 has a downwardly extending flange 13 provided with a bead 14 at its free edge. As seen in Figs. 1 to 3 inclusive, I employ a guard strip 15 in the form of a tube, which is circular in cross sectional form except for a projecting fin 16 arranged in the outer side face of said guard and adapted to project at right angles to the flange 13 when the guard is mounted in connection with the fender 11 as clearly seen in Fig. 2 of the drawing. The bead 14 of the fender is adapted to seat in the bore 17 of the guard, and said guard is split as seen at 18 to permit of the mounting of the guard strip in connection with the fender 11 in the manner shown in Figs. 1 and 2 of the drawing.

It will be understood that the guard strip 15 may be manufactured in indefinite lengths and cut to a size to fit the peripheral edge of fenders of different sizes, and is applied to the fender by simply springing the free tongue portion 19 of the guard strip laterally to permit of the passage of the bead 14 into the bore 17. When one edge of the strip has been applied, by simply applying pressure to the lower face of the strip, the remainder thereof will fall into place as will be apparent. The strip 15 may be composed of any suitable material and is preferably composed of rubber or composition rubber to give the required flexibility and yielding properties thereto as well as the cushioning properties, the projecting fin 16 serving to provide a marginal inch or fraction of an inch of safety in the operation of the vehicle, and especially in the endeavor to park or curb a vehicle at close quarters. It is a common experience with motorists to scratch or otherwise mar a car in the attempt to pass it at close quarters. By providing my improved guard on the protruding bodies or members of the vehicle, the operator has the protruding guard of safety, which in engaging another vehicle will give notice to the operator and permit of a correction without scratching or otherwise defacing the car so engaged.

It will also be understood that my improved guard strip may be produced in one or more colors which may be in harmony with the colors of the fenders or other parts of the body of the vehicle, or contrasting therewith, to give a pleasing, attractive as well as ornamental and finished appearance to the entire vehicle, it being understood that two or more colors may be contained in a single strip if desired to produce a striped or other effect on the strip itself.

In Fig. 4 of the drawing, I have shown at 20, another form of guard which consists simply in a tubular body having a bore 21 to receive the bead 14 on the flange 13 of the fender 11. Said guard strip is split as seen at 22 to permit of its mounting in connection with the fender. In other words, the projecting fin 16 is eliminated, but in this construction, it will be apparent that the thickness of the tube from which the strip 20 is formed provides the projecting guard portion for the fender, as will be apparent. It will be understood that any cross sectional form of guard may be employed without departing from the spirit of my invention. A very essential feature is that a portion of the guard strip projects beyond the outer, peripheral face of the fender to serve as a guard or buffer.

In Figs. 5, 6 and 7 of the drawing, I have shown at 23, a guard strip which is also indicated in Fig. 1 adapted to be mounted on the bumper 12 of the vehicle or at least the front plate 12ª of said bumper. In this construction, the guard strip 23 is made of such width as to cover the front face of the bumper 12 and the side edges of the guard strip 23 are provided with hook-shaped flanges 24, which form on the inner face of the strip, a socket in which the bumper 12 is adapted to be placed, the hook-shaped flanges 24 overlapping the top and bottom edges of the bumper as clearly seen in Fig. 6 of the drawing. The outer face of the guard strip 23 is provided with a projecting fin 25 which provides a resilient member extending a material distance beyond the front face of the bumper proper so that in striking or otherwise engaging another vehicle, the shock or engagement is taken up by the projecting fin which will readily yield and prevent destruction to such other vehicle, it being understood that I am referring to what might be termed slight or minor engagement of vehicles, and not serious collisions.

As seen in Fig. 5 of the drawing, the guard strip 23 is preferably extended around the looped or bowed ends of the spring bumper 12 as seen at 26 in order that all protruding portions of the vehicle, whether front or rear fenders or front or rear bumpers, will have the guard strips thereon, it being understood that the guard strips 23 are fashioned to suit the particular type or cross sectional form of bumper or bumpers employed. My invention is not limited to the specific cross sectional form shown in the accompanying drawing.

As seen in Fig. 7 of the drawing, the free edges 24ª of the hook-shaped flanges 24 normally extend in the direction of the front plate of the guard strip in order to tensionally and frictionally support the guard strip on the bumper 12 as will be apparent. The strip 23 is also preferably composed of resilient and yieldable material, such as rubber or composition rubber. In both forms of construction, it will be apparent that the guard strips may be made substantially endless and cut to the respective sizes in the application to the vehicle or the several parts thereof. The strip 23 may be produced in any desired color or combination of colors to give an attractive and ornamental appearance to the bumpers of the vehicle. When attached, said strips will avoid the necessity of nickel-plating or otherwise finishing the bumpers of the vehicle and if produced in a white or silvery color will give the same attractive and finished appearance as though the bumper were nickel or silver plated.

It will be understood that while I have shown certain details of construction for carrying my invention into effect, that I am not necessarily limited to these details, and various changes in and modifications of the construction herein shown and described may be made within the scope of the appended claims, without departing from the spirit of my invention or sacrificing its advantages.

Having fully described my invention, what I claim as new and desire to secure by Letters Patent, is:—

1. A guard strip of the class described, comprising an elongated body said body being fashioned to permit of its mounting on a member to be protected and retained against displacement from said member by the structure of said body, and said body being of predetermined cross sectional form and the outer exposed surface thereof having a projecting rib of cushioning material.

2. A fender and bumper guard strip of the class described comprising an elongated body of resilient material, the cross sectional form of said body being such as to permit of the mounting of the strip in connection with a fender and bumper and to be retained against accidental displacement therefrom, and one face of said guard strip having a comparatively narrow projecting fin extending beyond the outermost face of the fender and bumper to provide a resilient marginal surface of safety.

3. The combination with the fender of a vehicle, of a guard strip of resilient material frictionally and tensionally engaging said fender, and provided when mounted in connection with the fender, with a portion extending beyond the peripheral edge of the fender, and said guard strip having on its outer face a projecting fin, and the transverse dimensions of the base of the fin being materially less than the corresponding dimensions of said strip.

4. A guard strip consisting of an elongated tubular body, said body being split longitudinally thereof, the member in connection with which said guard strip is mounted being insertable into said body through the split therein, the side walls formed by said split, engaging said member to prevent accidental displacement of the guard strip, the body of said strip being composed of rubber and a thin projecting resilient fin on said body.

5. A guard strip of the class described comprising an elongated body of rubber of predetermined cross sectional form, said strip being recessed at one side to permit the mounting thereof on a suitable support by the expansion of oppositely disposed walls which tensionally engage the support when the strip is mounted thereon, to support said strip against displacement, and a resilient member integral with said body and projecting from the outer face thereof and being of less transverse dimensions than the corresponding dimensions of said body.

6. A guard strip for detachable mounting in connection with a support and consisting of an elongated substantially tubular body of rubber, said body being divided longitudinally thereof to give access to the chamber therewithin, the member in connection with which said guard strip is mounted being insertable into the chamber of said body through the divided portion thereof, and the side walls formed by said divided portion engaging said member under the resilient tension of said rubber body to prevent accidental displacement of the guard strip.

In testimony that I claim the foregoing as my invention I have signed my name this 11th day of July, 1927.

HARRY E. SIPE.